US012095863B2

(12) United States Patent
Vichare et al.

(10) Patent No.: US 12,095,863 B2
(45) Date of Patent: Sep. 17, 2024

(54) WORKSPACE CONFIGURATION RECOMMENDER FOR HOTELING ENVIRONMENTS

(71) Applicant: Dell Products, L.P., Round Rock, TX (US)

(72) Inventors: Nikhil Manohar Vichare, Austin, TX (US); Vivek Viswanathan Iyer, Austin, TX (US); Gokul Thiruchengode Vajravel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 49 days.

(21) Appl. No.: 17/650,052

(22) Filed: Feb. 4, 2022

(65) Prior Publication Data
US 2023/0254376 A1 Aug. 10, 2023

(51) Int. Cl.
*G06Q 10/02* (2012.01)
*G06Q 10/10* (2023.01)
*H04L 67/025* (2022.01)
*H04L 67/125* (2022.01)
*H04L 67/131* (2022.01)

(52) U.S. Cl.
CPC ......... *H04L 67/125* (2013.01); *G06Q 10/103* (2013.01); *H04L 67/025* (2013.01); *H04L 67/131* (2022.05)

(58) Field of Classification Search
CPC ... H04L 67/125; H04L 67/025; H04L 67/131; G06Q 10/103
See application file for complete search history.

(56) References Cited

U.S. PATENT DOCUMENTS

| 6,591,314 | B1 * | 7/2003 | Colbath | H04N 5/775 710/36 |
| 7,051,327 | B1 * | 5/2006 | Milius | G06F 8/65 717/173 |
| 7,194,702 | B1 * | 3/2007 | Peasley | G06F 3/038 345/157 |
| 11,782,810 | B2 * | 10/2023 | Goel | H05K 7/1487 702/1 |
| 11,924,290 | B2 * | 3/2024 | Teshome | G06N 5/04 |
| 2003/0090501 | A1 * | 5/2003 | Anderson | G06F 3/0481 715/700 |
| 2004/0199518 | A1 * | 10/2004 | Shoobe | G06Q 10/06 |
| 2011/0029493 | A1 * | 2/2011 | Yin | G06Q 10/10 707/694 |

(Continued)

*Primary Examiner* — Nicholas P Celani
*Assistant Examiner* — Wuji Chen
(74) *Attorney, Agent, or Firm* — Fogarty LLP

(57) ABSTRACT

Systems and methods for providing workspace configuration recommendations in hoteling environments are described. In an embodiment, an Information Handling System (IHS) may include a processor and a memory coupled to the processor, the memory having program instructions stored thereon that, upon execution, cause the IHS to: receive telemetry data from a plurality of client IHSs, where the telemetry data comprises integrated device data and workspace device data. The program instructions may, upon execution, further cause the IHS to identify, for a client IHS, a workspace configuration recommendation usable in a selected one of a plurality of workspaces based, at least in part, upon the telemetry data, and to transmit an indication of the recommendation to the client IHS.

20 Claims, 5 Drawing Sheets

(56) References Cited

U.S. PATENT DOCUMENTS

| | | | | |
|---|---|---|---|---|
| 2012/0054474 | A1* | 3/2012 | Vichare | G06Q 50/06 |
| | | | | 713/1 |
| 2014/0149658 | A1* | 5/2014 | Boyd | G06F 3/0689 |
| | | | | 711/112 |
| 2015/0056920 | A1* | 2/2015 | Huttunen | H04B 7/26 |
| | | | | 455/41.2 |
| 2015/0095270 | A1* | 4/2015 | Shabbir | G06Q 10/00 |
| | | | | 706/12 |
| 2015/0215153 | A1* | 7/2015 | Andrews | H04L 41/0836 |
| | | | | 709/223 |
| 2015/0215747 | A1* | 7/2015 | Kemmerer, Jr. | H04W 4/50 |
| | | | | 455/518 |
| 2017/0003984 | A1* | 1/2017 | Gatson | G06F 9/44505 |
| 2017/0155710 | A1* | 6/2017 | Quinn | H04L 67/56 |
| 2017/0235622 | A1* | 8/2017 | Boyapalle | G06F 11/3065 |
| | | | | 714/47.2 |
| 2017/0257303 | A1* | 9/2017 | Boyapalle | H04L 67/1001 |
| 2018/0081837 | A1* | 3/2018 | Helberg | G06F 13/4282 |
| 2018/0314617 | A1* | 11/2018 | Khosrowpour | G06F 11/3409 |
| 2019/0253311 | A1* | 8/2019 | Hockett | H04L 41/5041 |
| 2019/0265989 | A1* | 8/2019 | Mohamed Haneefa | |
| | | | | G06F 18/24 |
| 2019/0334952 | A1* | 10/2019 | Dhoble | H04L 63/10 |
| 2020/0134394 | A1* | 4/2020 | Teshome | G06N 3/0418 |
| 2020/0218324 | A1* | 7/2020 | Decamp | G06F 1/329 |
| 2021/0026460 | A1* | 1/2021 | Iyer | H04L 41/0806 |
| 2021/0232627 | A1* | 7/2021 | Schuckle | G06F 16/90348 |
| 2021/0271495 | A1* | 9/2021 | Smith | G06F 3/04812 |
| 2022/0012339 | A1* | 1/2022 | Martinez | G06F 9/441 |
| 2022/0019509 | A1* | 1/2022 | Iyer | G06F 11/3409 |
| 2022/0053036 | A1* | 2/2022 | Vashisht | H04L 65/403 |
| 2022/0123797 | A1* | 4/2022 | Files | H04B 7/0608 |
| 2022/0198043 | A1* | 6/2022 | Kozlowski | G06F 21/577 |
| 2022/0222163 | A1* | 7/2022 | Khosrowpour | G06N 20/00 |
| 2022/0286370 | A1* | 9/2022 | Iyer | H04L 41/0893 |
| 2023/0222087 | A1* | 7/2023 | K | G06F 9/5044 |
| | | | | 713/1 |
| 2023/0350816 | A1* | 11/2023 | Thiruchengode Vajravel | |
| | | | | G06F 13/10 |
| 2023/0401493 | A1* | 12/2023 | Thiruchengode Vajravel | |
| | | | | G06Q 10/02 |
| 2024/0028024 | A1* | 1/2024 | Aurongzeb | G06Q 50/26 |
| 2024/0036999 | A1* | 2/2024 | Aurongzeb | G06F 9/542 |

* cited by examiner

WORKSPACE CONFIGURATION RECOMMENDER FOR HOTELING ENVIRONMENTS

FIELD

This disclosure relates generally to Information Handling Systems (IHSs), and, more specifically, to systems and methods for providing workspace configuration recommendations in hoteling environments.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern enterprises, the term "hoteling" (or "office hoteling") refers to a practice where workers dynamically schedule their hourly, daily, or weekly use of office desks, cubicles, or rooms (e.g., a conference room), thus serving as an alternative to permanently assigned seating. Generally, employees access a reservation system to book a workspace before they arrive at work, which gives them freedom and flexibility to work where they want to.

SUMMARY

Systems and methods for providing workspace configuration recommendations in hoteling environments are described. In an illustrative, non-limiting embodiment, an Information Handling System (IHS), may include a processor and a memory coupled to the processor, the memory having program instructions stored thereon that, upon execution, cause the IHS to: receive telemetry data from a plurality of client IHSs, where the telemetry data comprises integrated device data and workspace device data; identify, for a client IHS, a workspace configuration recommendation usable in a selected one of a plurality of workspaces based, at least in part, upon the telemetry data; and transmit an indication of the recommendation to the client IHS.

The integrated device data may include data associated with at least one of: a processor, a memory, a Graphical Processing Unit (GPU), a display, a camera, a microphone, a loudspeaker, or a user input device. The workspace device data may include data associated with at least one of: an external GPU (eGPU), a display, a camera, a microphone, a loudspeaker, a user input device, or a user output device.

To identify the recommendation, the program instructions, upon execution, may cause the IHS to identify a combination of one or more integrated devices and one or more workspace devices most frequently selected by users operating the plurality of client IHSs. Additionally, or alternatively, to identify the recommendation, the program instructions, upon execution, may cause the IHS to determine that the client IHS is of a same model as the plurality of client IHSs. Additionally, or alternatively, to identify the recommendation, the program instructions, upon execution, may cause the IHS to modify the combination of one or more integrated devices and one or more workspace devices based upon a prior configuration modification by a user of the client IHS.

The telemetry data may include application data associated with a collaboration application executed by the client IHS during a collaboration session. For example, the telemetry data further may include at least one of: a number of Frames-Per-Second (FPS), a latency, jitter, a packet loss, and a number of call drops. Additionally, or alternatively, the telemetry data may include at least one of: a number of rejoins, a number of network drops, a number of forced restarts, a lack of performance, a high temperature, or a fan noise level. Additionally, or alternatively, the telemetry data may include user feedback received in connection with other collaborations sessions in the selected workspace.

The application data may include at least one of: an identity of the collaboration application, a starting time of the collaboration session, a type of the collaboration session, or a title of the collaboration session. Additionally, or alternatively, the application data may include at least one of: a number of users expected to be in attendance at the collaboration session, an expected duration of the collaboration session, an expected amount of speaking time by a user of the client IHS during the collaboration session, an expected role of the user during the collaboration session, a noise suppression setting expected during the collaboration session, an expected use of a virtual background during the collaboration session, an expected use of a screen sharing feature during the collaboration session, or an expected amount of screen sharing time during the collaboration session.

At least a portion of the application data may be determined from a calendaring application. Additionally, or alternatively, at least a portion of the application data may be related to one or more previous collaboration sessions.

In another illustrative, non-limiting embodiment, a memory storage device may have program instructions stored thereon that, upon execution by an IHS, cause the IHS to: transmit telemetry data to a remote recommendation service configured to generate a workspace configuration recommendation based upon the telemetry data, where the recommendation is usable during a collaboration session in a selected one of a plurality of workspaces, and where the telemetry data comprises integrated device data and application data; receive, from the remote recommendation service, an indication of the recommendation; and in response to a determination that the IHS is within a spatial or temporal distance from the selected workspace, implementing at least a portion of the recommendation.

The integrated device data may include data associated with at least one of: a processor, a memory, a GPU, a display, a camera, a microphone, a loudspeaker, or a user input device, and the application data may include at least one of: an identity of a collaboration application, a starting time of the collaboration session, a type of the collaboration session, or a title of the collaboration session. The telemetry data may include user feedback received in connection with other collaborations sessions in the selected workspace.

In yet another illustrative, non-limiting embodiment, a method may include producing a workspace configuration recommendation usable by an IHS in a selected one of a plurality of workspaces during a collaboration session, wherein the recommendation is produced based, at least in part, upon: (i) integrated device data collected by the IHS, and (ii) workspace device data; and transmitting an indication of the recommendation to the IHS.

The integrated device data may include data associated with at least one of: a processor, a memory, a GPU, a display, a camera, a microphone, a loudspeaker, or a user input device. The workspace device data may include data associated with at least one of: an eGPU, a display, a camera, a microphone, a loudspeaker, a user input device, or a user output device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below.

Figure 1:
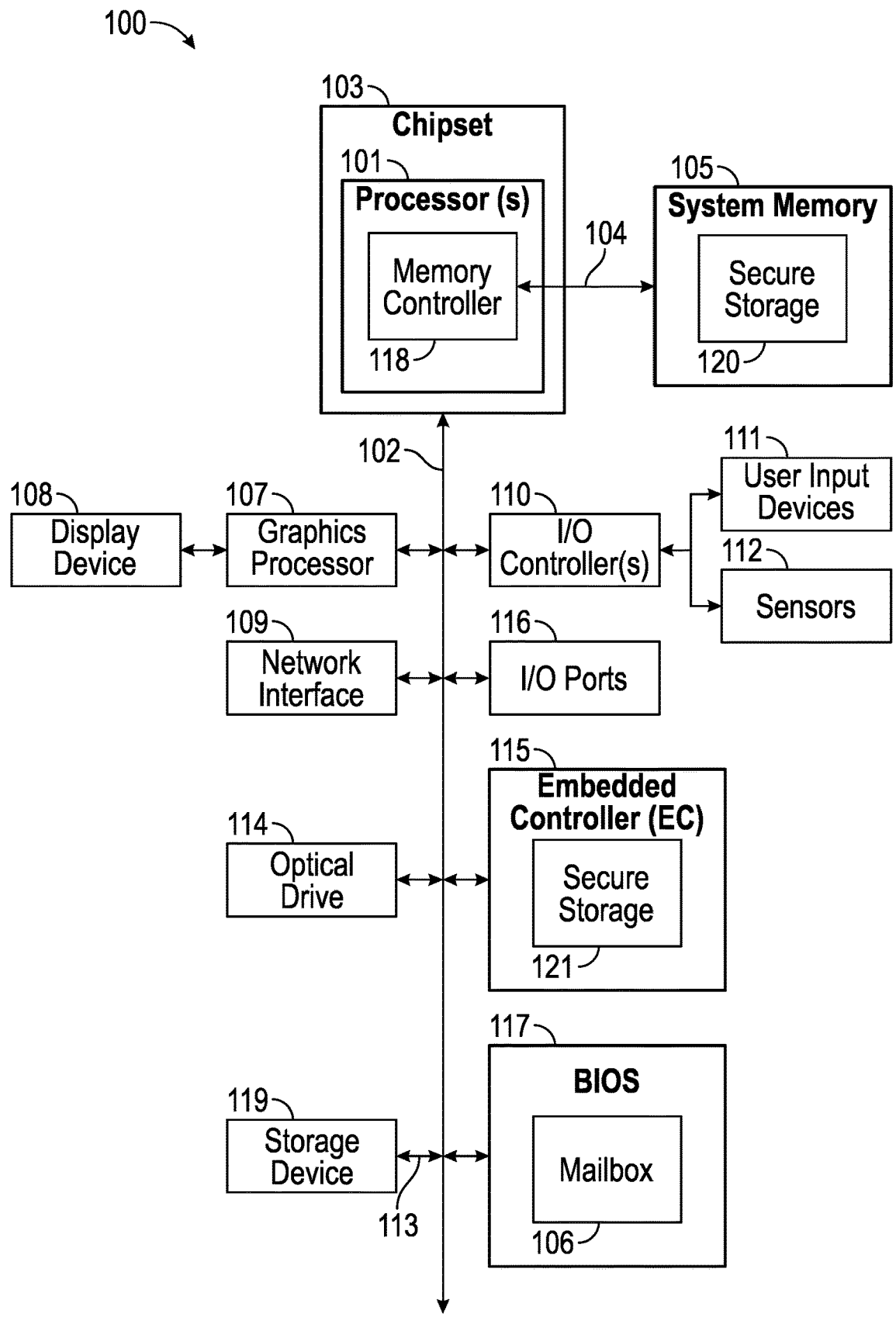
FIG. 1 is a diagram depicting examples of components of an Information Handling System (IHS), according to some embodiments.

FIG. 1 is a diagram depicting components of an example IHS 100 configured to provide workspace configuration recommendations in hoteling environments. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing operations.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 include an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on contents of secure storage 120 and stored as a reference signature. The integrity of the data stored in secure storage 120 may then be validated later by recalculating this signature of the contents of the secure storage and comparing the recalculated signature against the reference signature.

IHS 100 utilizes chipset 103 that may include one or more integrated circuits coupled to processor(s) 101. In the embodiment of FIG. 1, processor(s) 101 are depicted as component(s) of chipset 103. In other embodiments, all of chipset 103, or portions of chipset 108, may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WiFi, and/or BLUETOOTH. In certain embodiments, network interface 109 may support connections between a trusted IHS component, such as Embedded Controller (EC) 115, and a remote service, such as a remote workspace configuration recommendation service, or the like. In such embodiments, a connection supported by network interface 109 between the remote service and EC 115 may be considered an out-of-band (OOB) connection that is isolated from any Operating System (OS) of IHS 100.

Chipset 102 may also provide access to one or more display device(s) 108 via graphics processor 107. In certain embodiments, graphics processor 107 may be part of one or more video or graphics cards/controllers, installed as components of IHS 100. Graphics processor 107 may generate display information and provide the generated information to one or more display device(s) 108 coupled to IHS 100. Display device(s) 108 may include integrated display devices and/or external display devices coupled to IHS, such as via I/O port 116. In certain embodiments, graphics processor 107 may be integrated within processor(s) 101.

One or more display devices 108 coupled to IHS 100 may utilize Liquid Crystal Display (LCD), Light Emitting Diode (LED), organic LED (OLED), or other thin film display technologies. Each display device 108 may be capable of touch input such as via a touch controller which may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may receive data obtained by inertial movement sensors, including accelerometers, gyroscopes, and/or magnetometer sensors, and it may determine the orientation and movement of IHS 100 based, at least in part, on that data (e.g., IHS 100 is motionless on a relatively flat surface, IHS 100 is being moved irregularly and is likely in transport, the hinge of IHS 100 is oriented in a vertical direction).

In certain embodiments, the sensor hub may also include capabilities for determining a location and movement of IHS 100 based on triangulation of network signals and/or based on network information provided by the OS and/or network interface 109. In some embodiments, the sensor hub may support additional sensors, such as optical, infrared and sonar sensors, that may provide support for xR (virtual, augmented, and/or mixed reality) sessions hosted by IHS 100 and that may be used to provide an indication of a user's presence near IHS 100, such as whether a user is present, absent, and/or facing integrated display 108.

In cases where the end-user is present before IHS 100, the sensor hub may further determine a distance between the end-user and IHS 100, and such a determination may be made continuously, at periodic intervals, or upon request. These detected, calculated, or estimated distances may be used by processor(s) 101 to classify the user as being in IHS 100's near-field (user's position<threshold distance A), mid-field (threshold distance A<user's position<threshold distance B, where B>A), or far-field (user's position>threshold distance C, where C>B).

In embodiments where IHS 100 supports multiple physical configurations, such as a convertible laptop, N-in-1 device, or the like, the sensor hub may utilize one or more mode sensors 112 that collect readings usable to determine the posture in which IHS 100 is physically configured. In certain embodiments, posture determinations may be additionally made using movement and orientation information provided by sensors 112. In laptop and convertible laptop embodiments, for example, processor(s) 101 or EC 115 may utilize a lid position sensor 112 to determine the relative angle between the two panels of the laptop to determine the mode in which IHS 100 is physically configured. For example, the lid position sensor may measure the angle of rotation of the hinge that connects the base panel and lid panel of IHS 100. In some cases, processor(s) 101 or EC 115 may provide collected lid position information, such as the hinge angle, to the sensor hub for use in determining the posture in which IHS 100 is configured. Alternatively, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further identify the posture in which IHS 100 is physically configured.

For instance, if the sensor hub determines that IHS 100 is configured with a hinge angle characteristic of a laptop configuration, but IHS 100 is oriented on its side, IHS 100 may be determined to be in a book posture. Additionally, or alternatively, if IHS 100 is determined to be tilted such that the hinge is oriented between horizontal and vertical, the user's face is detected to be facing the integrated display, and IHS 100 is experiencing slight movement, the sensor hub may determine that IHS 100 is being used in the book posture.

The sensor hub may determine that IHS 100 is opened to a 180-degree hinge angle and lies on a flat surface, thus indicating that IHS 100 it is being used in a landscape posture. The sensor hub may similarly determine that IHS 100 is in a tent posture, in response to detecting a hinge angle within a defined range, such as between 300 and 345 degrees, and detecting an orientation of IHS 100 where the hinge is aligned horizontally and is higher than both display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via I/O port 116 may include storage devices that support transfer of data to and from system memory 105 and/or storage devices 119 of IHS 100. Access to storage devices via I/O port 116 may result in a change in a security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117's instructions to initialize and test hardware components coupled to IHS 100. Upon execution, these instructions may facilitate the loading of an OS (e.g., WINDOWS, MACOS, iOS, ANDROID, LINUX, etc.) for use by IHS 100. BIOS 117 provides an abstraction layer that allows the OS to interface with hardware components of IHS 100. The Unified Extensible Firmware Interface (UEFI) was designed as a successor to BIOS. As a result, many IHS 100 may utilize UEFI in addition to or instead of a BIOS. As used herein, BIOS is intended to also encompass UEFI.

As illustrated, BIOS 117 may include a predefined memory or memory region that may be referred to as NVM (Non-Volatile Memory) mailbox 106. In such an implementation, mailbox 106 provides a secured storage location for use in storing access policies, signatures, cryptographic keys, or other data. For example, BIOS mailbox 106 may be utilized as a secure storage utilized by a remote recommendation service to store recommendations, access policies, and/or cryptographic keys for use in delivering and deploying workspace configuration recommendations on IHS 100. BIOS mailbox 106 and secured storage 120 in system memory 105 may be utilized in this manner instead of, or in conjunction with, out-of-band functions implemented by EC 115.

EC 115 may be installed as a component of the motherboard of IHS 100. EC 115 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core operations of IHS 100, such as power management and management of certain modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support different reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, EC 115 may initiate operations for shutting down IHS 100 or placing IHS 100 in a low-power mode.

EC 115 may be additionally configured to calculate signatures that uniquely identify individual components of IHS 100. In such scenarios, EC 115 may calculate a hash value based on the configuration of a hardware and/or software component coupled to IHS 100. For instance, EC 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100.

In some cases, secure storage 121 may be utilized as a secure storage utilized by a remote recommendation service to store recommendations, access policies, and/or cryptographic keys for use in delivering and deploying workspace configuration recommendations on IHS 100.

In various embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, wearables (e.g., smart watches), etc.

As noted above, the practice of hoteling typically involves having workspaces (e.g., desks, cubicles, conference rooms, offices, etc.) available for employees, workers, clients, or users (hereinafter "hoteling users" or "users") to reserve or claim in advance, or throughout the workday, instead of traditional permanent seating. In some implementations, a workspace may include its own distinct set of peripheral devices (e.g., keyboards, mice, touchscreens, touchpads, trackpads, trackballs, pens, tablets, joysticks, webcams, digital camcorders, scanners, biometric sensors, displays, projectors, TVs, printers, plotters, speakers, microphones, headsets, external hard drives, media card readers, digital mixers, MIDI equipment, etc.) available to users.

Typically, when a user arrives at a workspace, their IHS may be coupled to one or more peripheral devices via a Workspace Managing Device (WMD) such as a dock, docking station, intelligent hub, external display, wireless KVM, or other IHS. Additionally, or alternatively, a user's IHS may be directly coupled to one or more peripheral devices using any suitable wireless communication protocol (e.g., BLUETOOTH or "BT," BLUETOOTH LOW ENERGY or "BLE," ZIGBEE, Z-WAVE, WI-FI, WI-FI DIRECT, etc.).

Whenever a workspace is accessed by a user, the user typically spends a significant amount of time selecting and configuring that workspace's devices for use with their IHS. In some cases, a user may access several different workspaces a day. Every time a user moves between workspaces, they must manually change their IHS's configuration with respect to the available (or unavailable) workspace devices.

For example, consider a scenario where an "office desk" workspace includes two different displays, one of them having an integrated webcam and microphone connected to a wireless dock. Meanwhile, a "lab" workspace has four identical monitors (e.g., placed in a 2×2 matrix) and an external GPU (eGPU) coupled to a dock via wired USB-C cables. As a user accesses these two different workspaces throughout the day, systems and methods described herein enable the user's IHS to change its configuration according to the different groups of devices available in those workspaces.

In various embodiments, workspace configuration recommendations for a given workspace may be specific or individual to each user. For instance, in the previous scenario, when a particular user connects to the office desk workspace, they may prefer to use the external webcam for all purposes (e.g., Win10 hello authentication, remote conferencing sessions, etc.). Accordingly, systems and methods described herein may provide workspace configuration recommendations that are aligned with a user's individual preferences in each given workspace.

In addition, workspace configuration recommendations for a given workspace may be specific to a user's IHS. For example, a user may have a first IHS that includes a discrete GPU and a second IHS of a different model that does not have such a GPU. Whenever the user connects to the lab workspace with the second IHS, they get better performance from the eGPU. When the user operates the first IHS, however, performance is worse with the eGPU. In such a scenario, systems and methods described herein may recommend that the user connect to the eGPU in the lab workspace only when using the second IHS.

In addition, workspace configuration recommendations for a given workspace may be specific to a particular software application executed by IHS 100. For example, when connecting to the office desk workspace, a user may prefer to use an integrated camera for authentication purposes and an external webcam for remote conferencing applications. In this case, systems and methods described herein may recommend that a first application use a given set of devices and that a second application use a different set of devices when executed in a particular workspace.

In addition, workspace configuration recommendations for a given workspace may be specific to a context in which IHS 100 is operating. For example, BT headset with video and audio muted when attending conferencing sessions in the form of townhalls or webinars. In one-on-one meetings, however, the same user may prefer to use a webcam with audio enabled. In these cases, systems and methods described herein may recommend, based upon contextual information obtained from the remote conferencing or calendaring application (e.g., an identity of the collaboration application, a starting time of the collaboration session, a type of the collaboration session, a title of the collaboration session, etc.), that a selected set of devices be used in a particular workspace.

In some situations, when a user connects to a workspace for the first time, systems and methods described herein may obtain workspace configuration details from a remote service, such as configurations previously selected by other users (e.g., with a different instance of the same or similar IHS model), to curate a first-time recommendation for the user.

As such, systems and methods described herein may select, recommend, and/or automatically configure a connected group of devices settings and workspace configurations based on learned data from the user (e.g., by persona, etc.), IHSs, other users, workspaces, connected devices, applications, context, and the like. To achieve this, systems and methods may collect telemetry and user feedback data such as, for example: details of devices (e.g., users IHS, devices available in the workspace, etc.), user preferences and historical selections (e.g., audio, video, display, default vs. selection by user, etc.), conferencing session variables (e.g., application used, multiple variables from in-app telemetry such as ZOOM telemetry or MICROSOFT Graph API, etc.), detractor variables (e.g., related to system performance, thermals, health that affect call quality, etc.), direct user feedback (e.g., experience score such as thumbs up/down or n-stars, obtained from conferencing application or using a digital experience management suite), and/or implied feedback (e.g., audio/video/network related performance directly related to each call session).

Examples of telemetry and user feedback data collected for each user across IHSs and remote conferencing sessions are shown in Table I below:

TABLE I

| IHS | Workspace Devices | User Selection | Conferencing Session Variables | Detractor Variables | Explicit Experience Score | Measured Performance |
|---|---|---|---|---|---|---|
| PRECISION 5760 (i7-11850H, NVIDIA RTX, 32 GB RAM) | DELL 27 USB-C Monitor; DELL UltraSharp 27 4K Color; Logitech C930 | Keeps default | Application; # of users; call duration; % speaking time; noise suppression level | # of re-joins; network drops; forced restarts; high fan noise level | 4 stars | Audio (send/receive): latency, jitter, packet loss %, etc. |
| LATITUDE 9250 (i5-1145G7, 16GB RAM, INTEL Xris Xe) | DELL 55 4K Interactive Touch Monitor; LOGITECH HD; JABRA GN100 | Changes to preferred | Video share; virtual background use (y/n); screen share (y/n); % time screen share | Lack of performance; High temperature | 3 stars | Video (send/receive): FPS, resolution, latency, jitter, packet loss %, etc. |

Figure 2:
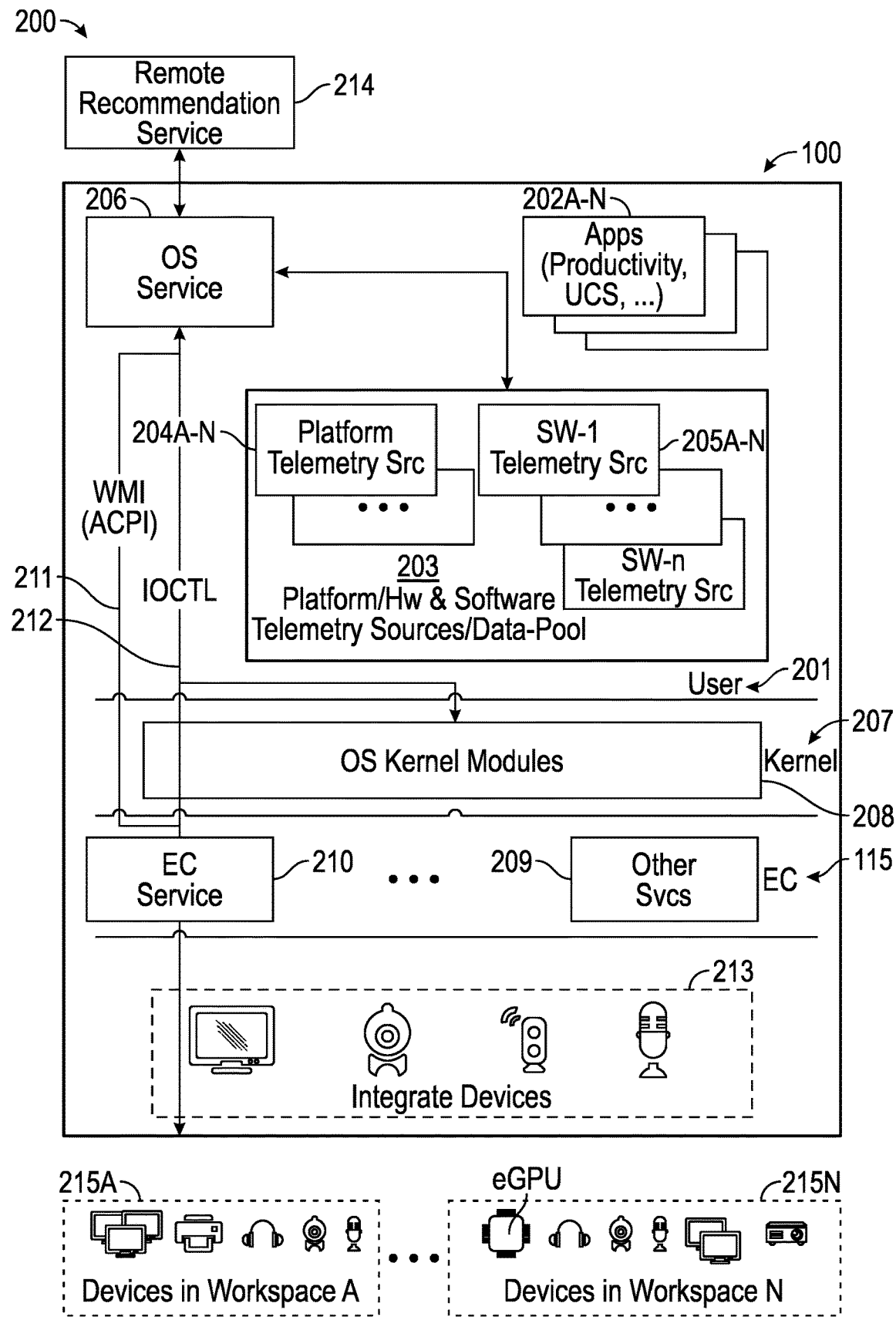
FIG. 2 is a diagram of an example of a system for providing workspace configuration recommendations in hoteling environments, according to some embodiments.

FIG. 2 is a diagram of an example of system 200 for providing workspace configuration recommendations in hoteling environments. In some embodiments, components of system 200 may be instantiated through the execution of program instructions stored in a memory device or computer-readable medium. Furthermore, components of system 200 may be configured to perform operations of methods 300-500 shown in FIGS. 3-5 and described in more detail below.

In system 200, IHS 100 includes integrated hardware devices 213 (e.g., display, webcam, speakers, microphone, etc.), one or more of which may be in communication with other EC services 209 of EC 115. In operation, IHS 100 produces user space 201 and kernel space 207. Kernel space 207 includes one or more OS kernel modules 208, which may be object files that contain code to extend the base kernel of IHS 100's OS, usable to add support for new hardware (e.g., device drivers) and/or filesystems, or for adding system calls.

User space 201 includes applications 202A-N (e.g., productivity applications, browsers, multimedia applications, games, remote audio/video conferencing applications, Unified Communication Services or "UCS," etc.), as well as platform/hardware and software telemetry collection sources or data pool(s) 203. For example, telemetry sources or data pool(s) 203 may include hardware sources 204A-N and software sources 205A-N.

OS service 206 is coupled to EC service 210 via Windows Management Instrumentation (WMI) Advanced Configuration and Power Interface (ACPI) bus 211 and/or Input/Output Controller (IOCTL) bus 212. OS service 206 is also coupled to remote recommendation service 214, for example, over a network (e.g., the Internet). In some cases, remote recommendation service 214 may be implemented using other instances of IHS 100 (e.g., servers, etc.).

As a user transports their IHS 100 between workspaces A-N, remote recommendation service 214, OS service 206, and EC service 210 may operate together to provide workspace configuration recommendations with respect to external devices 215A-N in each corresponding workspace. Particularly, remote recommendation service 214 may implement any of methods 300-500 to provide a workspace configuration recommendation to OS service 206 based upon inputs including, for example: platform telemetry 204A-N, meeting session telemetry and application telemetry 205A-N, context information, and/or user feedback.

EC service 210 may expose an Application Programming Interface (API) via UEFI ACPI methods to perform system-level operations and produce dock/undock notifications that are not supported by OS kernel modules 208. For example, EC service 210 may control system and device configuration (e.g., turbo, battery charge and discharge rates or "C-Rates," etc.) and it may notify OS service 206 of system-level events (e.g., battery Relative State-Of-Charge or "RSOC," C-Rate, power adapter input power, connection/disconnection to or from a dock having a certain ID or "dock/undock events," etc.).

OS service 206 may be executed as a system background service and is configured to operate which IHS 100 is in Modern Standby. Upon initialization, OS service 206 registers with OS 208 and with EC service 210 for workspace access notifications (e.g., dock/undock events, etc.). OS service 206 then establishes a session with telemetry sources 203 (e.g., platform telemetry, application telemetry, conference session telemetry, etc.), and enumerates and caches integrated devices 213. In its steady state, OS service 206 retrieves telemetry data from registered telemetry sources 203, caches it, and sends it periodically to remote recommendation service 214.

Upon connecting to a workspace (e.g., a dock event), OS service 206 creates a bundle of information and sends it to remote recommendation service 214. For example, the bundle may include a workspace unique ID received from EC service 210, details about devices that are externally connected to IHS 100 via the workspace and/or dock, current running application details, and other context information. Remote recommendation service 214 receives the bundle and uses method 300-500 to curate and return a workspace configuration recommendation to OS service 206.

OS service 206 applies the recommendation (e.g., by setting a system configuration such as which internal/external webcam to use, application placement across displays, which audio output to use for a remote conference application, etc.). Then, upon disconnecting from the workspace (e.g., an undock event), OS service 206 relays this event to EC service 210 and returns the IHS 100's configuration to its original state (e.g., internal devices to be used, audio volume for a meeting, etc.).

Figure 3:
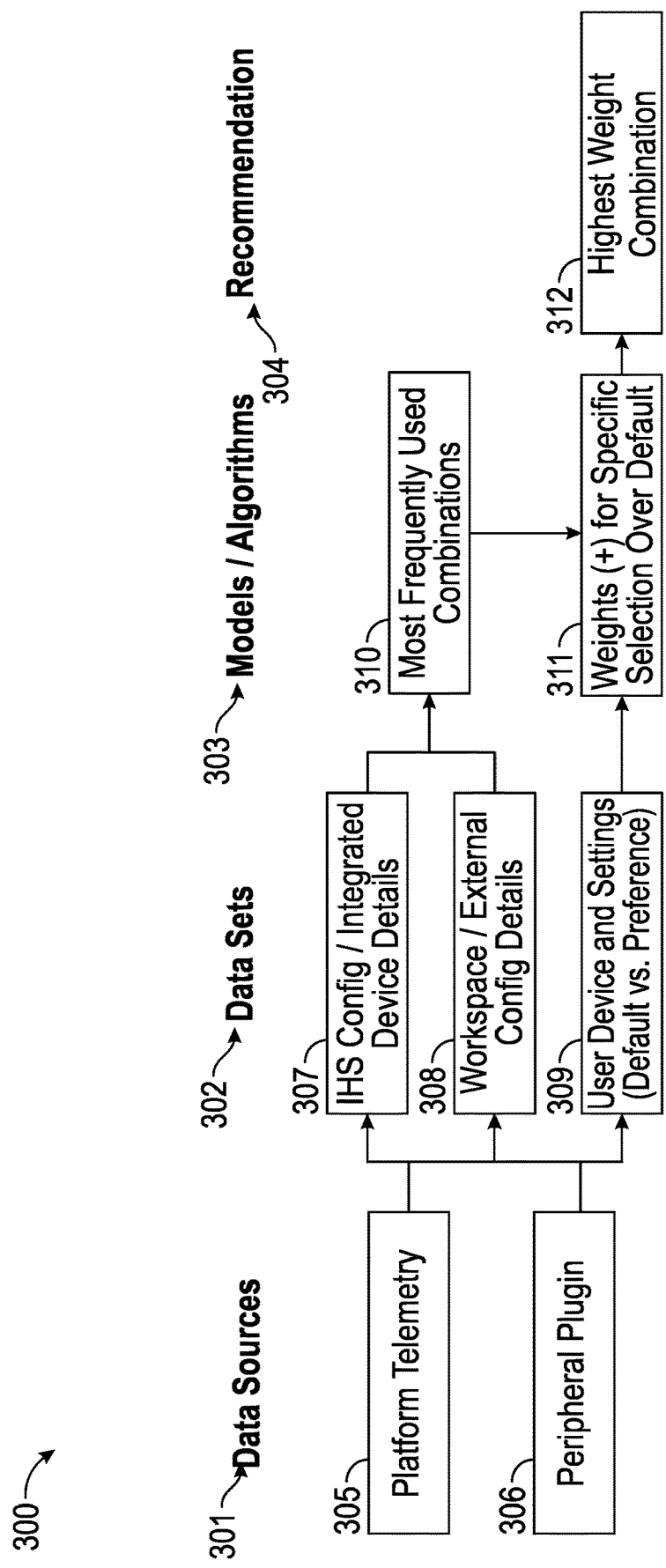
FIGS. 3-5 are flowcharts of examples of methods for providing workspace configuration recommendations in hoteling environments, according to some embodiments.

FIG. 3 is a flowchart of an example of method 300 for workspace configuration recommendation in hoteling environments. In various embodiments, method 300 may be performed, at least in part, by remote recommendation service 214 in cooperation with OS service 206 and/or EC service 210. At 301, IHS 100 may collect data from sources such as platform telemetry 305 and peripheral plugin modules 306 (e.g., 204A-N).

At 302, IHS 100 may assemble datasets which are then transmitted to remote recommendation service 214. Datasets 302 may include IHS integrated device details 307 (e.g., 213), device details 308 (e.g., 215A-N) of devices found in a selected workspace, and user settings 309 (e.g., default vs. preferences). At 303, remote recommendation service 214 may apply one or more algorithms to 307 and 308 to determine the most frequently used device combinations 310 (e.g., by the user and/or other users) in the selected workspace, and it may also apply predetermined weights to specific user selections over default configurations 311. Then, at 311, recommendation service 214 may identify the highest weight configuration 312 and it may send an indication of that recommendation (e.g., as an encrypted XML file) to IHS 100.

As such, method 300 may: identify weighted frequently used combinations by user preference; track data across users on frequently used combinations of preferred system integrated devices, workspace devices, and meeting applications; mine frequently used combination; apply weights to user preference/changes over default settings; and recommend the most selected, preferred workspace configuration.

In some cases, method 300 may operate with relatively little telemetry data. For example, even in a case where a user is new and there is no history of preferences or configuration changes for that user, method 300 may still recommend workspace configurations based upon the configurations of other users operating IHSs of the same (or sufficiently similar) model.

Figure 4:
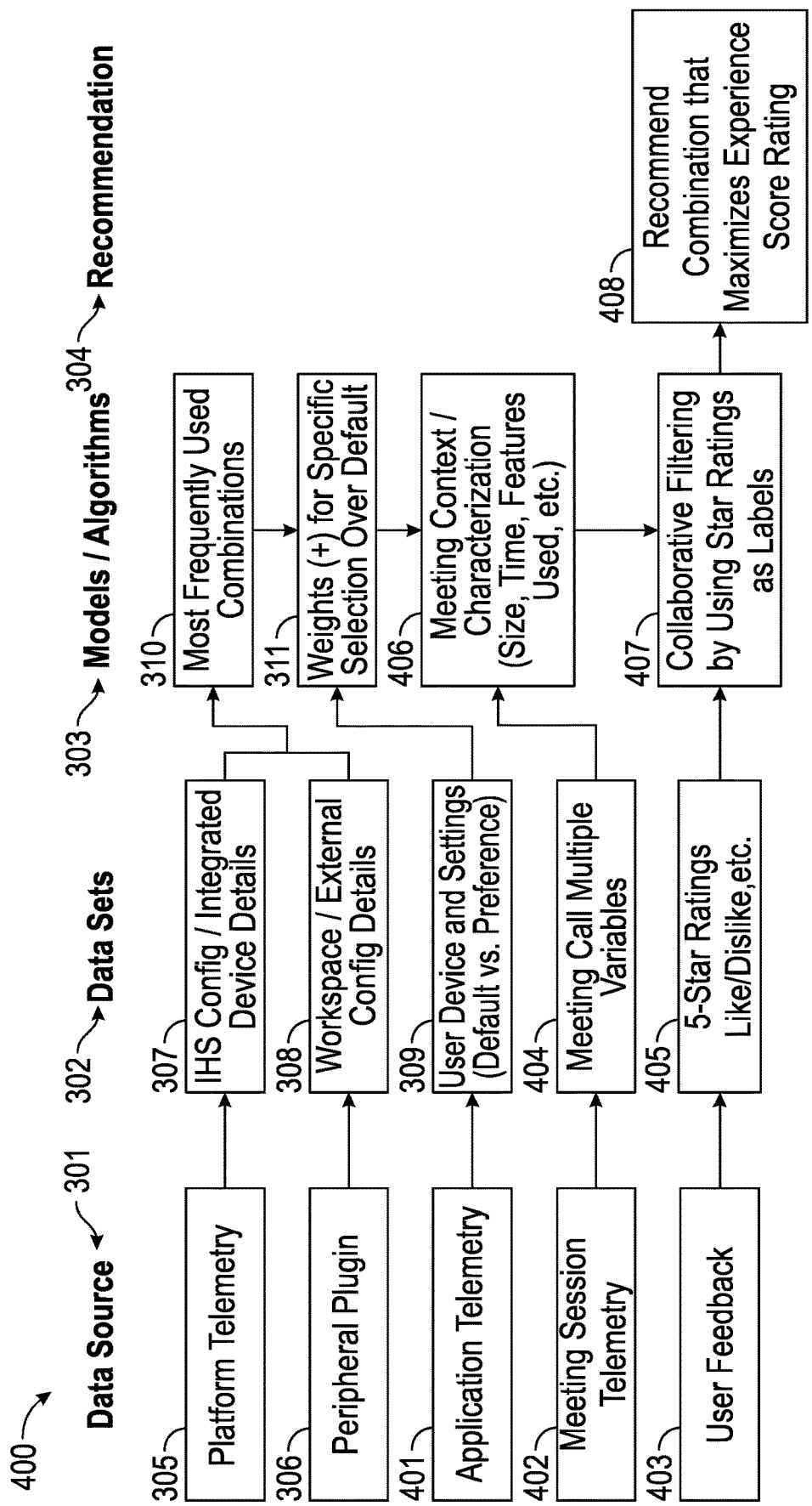

FIG. 4 is a flowchart of an example of method 400 for workspace configuration recommendation in hoteling environments. In various embodiments, method 400 may be performed, at least in part, by remote recommendation service 214 in cooperation with OS service 206 and/or EC service 210. In method 400, at 301, IHS 100 may additionally collect data from sources such as application telemetry 401, conference or meeting session telemetry 402, and/or user feedback 403 (e.g., 205A-N).

In this case, user device and settings 309 (e.g., default vs. preferences) may be derived from application telemetry 401. Datasets 302 may also include meeting/conference/call variables 404 obtained from meeting session telemetry 402, and user satisfaction ratings 405 (e.g., 5-star ratings, like/dislike, etc.) based on user feedback 403.

At 406, remote recommendation service 214 may produce meeting context/characterization data (e.g., size, time, features used, etc.) based on variables 404. At 407, remote recommendation service 214 may apply any suitable recommender or machine learning (ML) algorithm, such as Collaborative Filtering or "CF" (e.g., using ratings 405 as labels), context-aware CF, etc. to produce recommendation 408 that represents a combination of IHS-integrated and workspace devices that maximizes experience score rating.

As such, method 400 may: track all data across the experience including in-application telemetry for conferencing/meeting applications to detect meeting context, in addition to data collected for method 300; and it may take into account user provided feedback as a key variable after each meeting session, as collected by ZOOM, Graph API for Teams, etc. and/or IT-provisioned Digital Experience Management platforms (e.g., NEXTHINK, WS1, INSIGHTS, etc.).

In some cases, method 400 may operate with data available on system configuration, user preferences, and/or conferencing/meeting context. The ML or recommender model of 407 may be trained using the datasets as input and user experience scores as labels from a large numbers of users' telemetry data. In other cases, the ML model of 407 may be used to find or suggest available workspaces or workspace configurations that provide a better user experience score—i.e., if the best experience option is not available, recommend the second best and so on.

Figure 5:
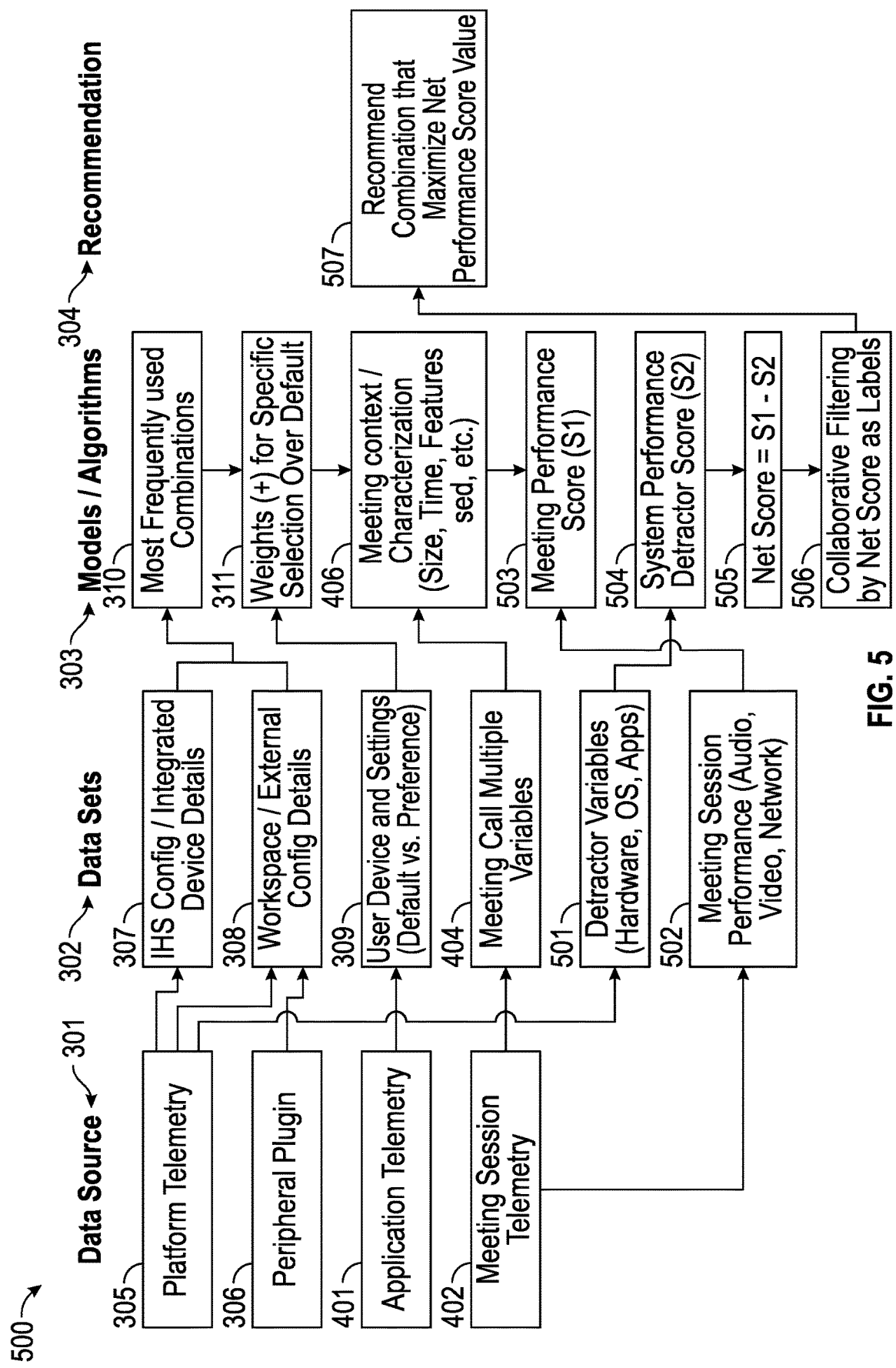

FIG. 5 is a flowchart of an example of method 500 for workspace configuration recommendation in hoteling environments. In various embodiments, method 500 may be performed, at least in part, by remote recommendation service 214 in cooperation with OS service 206 and/or EC service 210. In method 500, at 302, IHS 100 may additionally assemble datasets 302 to include detractor variables 501 (e.g., hardware, OS, applications, etc.) and meeting session performance variables 502 (e.g., audio, video, network, etc.).

At 503, remote recommendation service 214 may calculate a meeting performance score (S1) based on meeting context/characterization data 406 and meeting session performance variables 502 (e.g., audio, video, network, etc.). At 504, remote recommendation service 214 may calculate a system performance detractor score (S2) based on detractor variables 501, and it may calculate net score 505 as the difference between S1 and S2.

At 506, remote recommendation service 214 may apply any suitable recommender or ML algorithm, such as CF, context-aware CF, etc. using net scores 505 as labels to produce recommendation 507 that represents a combination of integrated and workspace devices that maximizes a net performance score value.

As such, method 500 may collect, in addition to the data tracked in methods 300 and 400, in-application telemetry usable to characterize different performance estimates: meeting session performance or "S1" (includes audio/video/network variables such as FPS, latency, jitter, call drops, etc.) and system detractor variables or "S2" (tracked using platform telemetry agents, such as DELL Data Vault, INSIGHTS, MSFT E3, etc.). The meeting performance score S1 may be a weighted average of multiple performance metrics scaled (e.g., on 0-to-1 scale using a logistic, min-max or robust scaling), whereas the performance detractor score S2 may be a scaled score of a weighted average of selected system performance metrics. The net meeting performance score is given by the difference between S1 and S2.

For example, method 500 may use learned context and real-time switching-based system performance to generate workspace configuration recommendations. A user may have data available on system configuration, preferences, and conferencing/meeting context, and remote recommendation service 214 may train an ML model using this information as input and conferencing/meeting performance scores as labels. Then, remote recommendation service 214 may use the trained ML model to find workspaces that provide the best conferencing/meeting experience. During a remote meeting, call, or conferencing session, method 500 may measure the detractor variables and update the net score. If available, remote recommendation service 214 may send an indication to IHS 100 to switch devices to another configuration that improves the net score, and it may use feedback from net score to derive subsequent workspace configuration recommendations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises,"

"has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
receive telemetry data from a plurality of client IHSs, wherein the telemetry data comprises integrated device data and workspace device data;
identify, based at least in part on the integrated device data from the plurality of client IHSs, one or more integrated devices for a particular client IHS;
identify, based at least in part on the workspace device data from the plurality of client IHSs, one or more workspace devices for the particular client IHS, wherein the one or more workspace devices comprises one or more of a set of peripheral devices;
produce, for the particular client IHS, a workspace configuration recommendation, comprising a combination of the one or more integrated devices and the one or more workspace devices, usable by the particular client IHS in a selected one of a plurality of workspaces, wherein the selected workspace comprises the set of peripheral devices available for coupling to the particular client IHS via a workspace managing device; and
transmit an indication of the workspace configuration recommendation, comprising the combination of the one or more integrated devices and the one or more workspace devices, to the particular client IHS.

2. The IHS of claim 1, wherein the integrated device data comprises data associated with at least one of: a processor, a memory, a Graphical Processing Unit (GPU), a display, a camera, a microphone, a loudspeaker, or a user input device.

3. The IHS of claim 1, wherein the workspace device data comprises data associated with at least one of: an external GPU (eGPU), a display, a camera, a microphone, a loudspeaker, a user input device, or a user output device.

4. The IHS of claim 1, wherein to produce the recommendation, the program instructions, upon execution, further cause the IHS to identify a combination of the one or more integrated devices and the one or more workspace devices most frequently selected by users operating the plurality of client IHSs.

5. The IHS of claim 4, wherein to produce the recommendation, the program instructions, upon execution, further cause the IHS to determine that the particular client IHS is of a same model as the plurality of client IHSs.

6. The IHS of claim 4, wherein to produce the recommendation, the program instructions, upon execution, further cause the IHS to modify the combination of the one or more integrated devices and the one or more workspace devices based upon a prior configuration modification by a user of the particular client IHS.

7. The IHS of claim 1, wherein the telemetry data further comprises application data associated with a collaboration application executed by the particular client IHS during a collaboration session.

8. The IHS of claim 7, wherein the application data comprises at least one of: an identity of the collaboration application, a starting time of the collaboration session, a type of the collaboration session, or a title of the collaboration session.

9. The IHS of claim 7, wherein the application data comprises at least one of: a number of users expected to be in attendance at the collaboration session, an expected duration of the collaboration session, an expected amount of speaking time by a user of the particular client IHS during the collaboration session, an expected role of the user during the collaboration session, a noise suppression setting expected during the collaboration session, an expected use of a virtual background during the collaboration session, an expected use of a screen sharing feature during the collaboration session, or an expected amount of screen sharing time during the collaboration session.

10. The IHS of claim 9, wherein at least a portion of the application data is determined from a calendaring application.

11. The IHS of claim 9, wherein at least a portion of the application data is related to one or more previous collaboration sessions.

12. The IHS of claim 1, wherein the telemetry data further comprises at least one of: a number of Frames-Per-Second (FPS), a latency, jitter, a packet loss, and a number of call drops.

13. The IHS of claim 1, wherein the telemetry data further comprises at least one of: a number of rejoins, a number of network drops, a number of forced restarts, a lack of performance, a high temperature, or a fan noise level.

14. The IHS of claim 1, wherein the telemetry data further comprises user feedback received in connection with other collaborations sessions in the selected workspace.

15. A memory storage device having program instructions stored thereon that, upon execution by a particular client Information Handling System (IHS), cause the particular client IHS to:
transmit telemetry data to a remote recommendation service configured to generate a workspace configuration recommendation based upon the telemetry data from the particular client IHS and other telemetry data from a plurality of other client IHSs, wherein the telemetry data and the other telemetry data comprise integrated device data and workspace device data;
receive, from the remote recommendation service, an indication of the workspace configuration recommendation, comprising a combination of one or more integrated devices and one or more workspace devices comprising one or more of a set of peripheral devices, usable by the particular client IHS during a collaboration session in a selected one of a plurality of workspaces, wherein the selected workspace comprises the set of peripheral devices available for coupling to the particular client IHS via a workspace managing device; and
in response to a determination that the particular client IHS is within a spatial or temporal distance from the selected workspace, implementing at least a portion of the workspace configuration recommendation, comprising the combination of the one or more integrated devices and the one or more workspace devices.

16. The memory storage device of claim 15, wherein the integrated device data comprises data associated with at least one of: a processor, a memory, a Graphical Processing Unit (GPU), a display, a camera, a microphone, a loudspeaker, or a user input device, and wherein the application data comprises at least one of: an identity of a collaboration application, a starting time of the collaboration session, a type of the collaboration session, or a title of the collaboration session.

17. The memory storage device of claim 15, wherein the other telemetry data further comprises user feedback received in connection with other collaborations sessions in the selected workspace.

18. A method, comprising:
    receiving integrated device data and workspace device data from a plurality of client Information Handling Systems (IHSs);
    identifying, based at least in part on the integrated device data from the plurality of client IHSs, one or more integrated devices for a particular client IHS;
    identifying, based at least in part on the workspace device data from the plurality of client IHSs, one or more workspace devices for the particular client IHS, wherein the one or more workspace devices comprises one or more of a set of peripheral devices;
    producing a workspace configuration recommendation, comprising a combination of the one or more integrated devices and the one or more workspace devices, usable by a particular client IHS in a selected one of a plurality of workspaces during a collaboration session, wherein the selected workspace comprises the set of peripheral devices available for coupling to the particular client IHS via a workspace managing device; and
    transmitting an indication of the workspace configuration recommendation, comprising the combination of the one or more integrated devices and the one or more workspace devices, to the particular client IHS.

19. The method of claim 18, wherein the integrated device data comprises data associated with at least one of: a processor, a memory, a Graphical Processing Unit (GPU), a display, a camera, a microphone, a loudspeaker, or a user input device.

20. The method of claim 18, wherein the workspace device data comprises data associated with at least one of: an external GPU (eGPU), a display, a camera, a microphone, a loudspeaker, a user input device, or a user output device.

* * * * *